United States Patent Office 3,359,234
Patented Dec. 19, 1967

3,359,234
STABILIZED POLYOLEFINS CONTAINING A NICKEL ALKANOATE AND A THIO-BIS-PHENOL
Jerry Peter Milionis, Franklin Township, Somerset County, and James Anthony Melchore, Middlesex, N.J., assignors to American Cyanamid Company, Stamford, Conn., a corporation of Maine
No Drawing. Filed June 26, 1963, Ser. No. 290,609
8 Claims. (Cl. 260—45.75)

This invention relates to the provision of stabilized polyolefins having improved qualities. More particularly, it relates to polyolefin compositions stabilized against the deteriorating effects of ultraviolet light by having incorporated therein a two-component stabilizing composition. It relates further to a method of stabilizing and improving polyolefins, and, still further, to the stabilizer useful therein.

It is well-known that polyolefins are sensitive to the action of ultraviolet light, and, in fact, many attempts have been made to stabilize polyolefins so that they can be used for prolonged periods in applications involving exposure to ultraviolet light. These attempts involved the addition of a material to the polyolefin, which material acted to prevent degradation resulting from ultraviolet light-initiated decomposition. Classically, the stabilizing additives exerted their effect by preferentially absorbing incident ultraviolet light, thereby keeping the harmful radiation from the sensitive polyolefinic material. Thus, in effect, they acted as shields for the polyolefin substrate. Very recently, it has been proposed to stabilize polyolefins by employing additives which do not function primarily as ultraviolet light absorbers, but exert their effect by inhibiting the ultraviolet light-initiated chain reaction which results in degradation of polyolefins. Examples of the latter type of additives are nickel phenol-phenolates and phenolates of bis-phenolsulfides. Although these nickel derivatives confer a degree of stability to polyolefins, they are not sufficiently effective to protect the substrate under very prolonged ultraviolet exposure. There is a need for materials capable of stabilizing polyolefins against ulraviolet light which do afford protection for extended periods of exposure.

The present invention, it is believed, overcomes problems of instability normally associated with polyolefins. In accordance therewith, it has been discovered that, when a mixture of (a) a nickel salt of an alkanoic (including cycloalkanoic) acid or alkane carboxylic acid as it is also known having 6–18 carbon atoms and (b) a bis-phenolsulfide of the following formula:

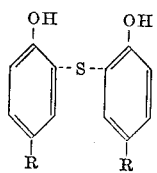

wherein R is an alkyl radical of 4–12 carbon atoms, is incorporated in a polyolefin material, the resulting polyolefin composition has extremely desirable qualities not possessed by the material without the additives as indicated above. It is stable for extremely long periods of exposure to ultraviolet light as will be described below.

Among the polyolefins which lend themselves to treatment by this invention are ethylene and, particularly, propylene homopolymers and copolymers, or mixtures thereof.

Specific polyolefins suitable for improvement in accordance with the present invention are polyethylene, polypropylene and copolymers thereof.

The stabilizer of the present invention is comprised of two essential components, namely, a nickel carboxylate and a thiobisphenol. The nickel carboxylate is the nickel salt of an alkanoic acid having from 6–18 carbon atoms. It may be acyclic or cyclic. Specific examples of suitable acids are hexanoic, naphthenic, octanoic, decanoic and stearic acids. The preferred salt is nickel stearate.

Specific examples of thiobisphenols useful in the stabilizer of the present invention are 2,2'-thiobis(4-butylphenol), 2,2'-thiobis(4-hexylphenol), 2,2'-thiobis(4-octylphenol) and 2,2'-thiobis(4-dodecylphenol). The preferred phenol is 2,2'-thiobis(4-octylphenol).

The method by which polyolefins, as described above, are stabilized by the two-component stabilizer, also described above, is advantageously a simple one. The two components of the stabilizer are blended with the polyolefin substrate. The polyolefin should be in particulate form (e.g., as a powder or a granulate). The components may be added individually in any order or as a preformed mixture. If it is desired, other additives such as plasticizers, colorants, extenders or stabilizers, may be added to the polyolefin at the same time. It is an extremely important part of the method of the present invention that the mixture of the polyolefin and the stabilizer be subjected to a temperature between 150°–280° C. for a short period (e.g., about ½ to 15 minutes, or more if desired) without destruction. High temperature treatment can very conveniently be effected concurrent with the milling or shaping operation to which the polyolefin is generally subjected.

The stabilizer combination of the present invention shows a significant stabilization effect at concentrations as low as about 0.1% based on the weight of the polyolefin substrate. When it is desired to impart stability against extreme conditions, the stabilizer may be used in a concentration of 3.0%, based on the weight of the polyolefin substrate. In general, however, it is found that within a range of 0.5% to 2.0% of stabilizer, sufficient stability is conferred upon the polyolefin to make it satisfactory for normal usage.

The ratio of nickel carboxylate to thiobisphenol may vary in the range of 0.75:1 to 4:1 on a weight basis. It is preferred, however, that 1–3 parts of the nickel salt be employed for each part of the thiobisphenol. However, either more or less of the nickel salt may be present and still permit the attainment of a stabilized polyolefin material.

The stabilized polyolefin of the present invention is extremely resistant to degradation from exposure to ultraviolet radiation. This beneficial effect is very surprising since, when either the nickel salt or the thiobisphenol component is used alone as a stabilizing additive, the degree of stability imparted to the polyolefin is practically negligible. The combination of the nickel salt and the thiobisphenol as above described, imparts stability for extremely long exposure periods.

The following examples are presented to further illustrate the present invention.

Example 1

This example compares effectiveness of the two-component stabilizer of the present invention with effects obtained when either component is used alone; and also the result of substituting a different nickel salt for that required by this invention.

For purposes of illustration, polypropylene was chosen to represent all the polyolefins which can be used in the present invention. Others, such as polyethylene and the copolymer of ethylene and propylene, could have been used instead.

It was found to have no effect on the resultant degree of stabilization whether the stabilizer was added to the polyolefin substrate one component at a time, or as a preformed mixture, and, therefore, only one procedure (i.e., adding the two components as a preformed mixture), is exemplified. The step of forming the stabilizing mixture merely involved the simple step of blending the two components in a dry state, using a conventional blending machine. The remainder of the procedure is described in more detail as follows:

Fifty grams of polypropylene powder were placed in a screw top jar along with the stabilizing additive to be tested. The blend was tumbled for two hours, and the mixture was placed on a 6" x 13" mill whose rolls were heated to 360° F. and 320° F., respectively. The blend was passed through the nip of the rolls, stripped from the rolls and fed endwise into the nip to insure maximum mixing. This operation of stripping and passing through the nip was repeated ten times. The sheet resulting from this blend (having a thickness of 10 to 15 mils) was compression-molded, and then cut into specimens suitable for exposure in the Fade-O-Meter. In the following table of results are shown the hours exposure in the Fade-O-Meter to the brittle point. Representing the phenol component of the stabilizer of this invention, is the compound, 2,2'-thiobis(4-t-octylphenol). For brevity, it is noted as the "Phenol Compound."

TABLE I

| Additive | Percent Conc. in Polypropylene | Brittle Point in hours |
|---|---|---|
| Control | | 20 |
| Nickel Stearate | 0.5 | 40 |
| Phenol Compound | 0.25 | 150 |
| Nickel Stearate | 0.5 | 800 |
| Phenol Compound | 0.25 | |
| Nickel Naphthenate | 0.5 | 800 |
| Phenol Compound | 0.25 | |
| Nickel Hexanoate | 0.5 | 800 |
| Phenol Compound | 0.25 | |
| Nickel Benzoate | 0.5 | 200 |
| Phenol Compound | 0.25 | |
| Nickel Acetate | 0.5 | 150 |
| Phenol Compound | 0.25 | |

*Example 2*

In this example, a control sample of polypropylene was tested against samples with nickel stearate combined with a phenol outside of the scope of Formula I. The tests were exactly as described in Example 1, and the following results were obtained.

TABLE II

| Additive | Percent Conc. in Polypropylene | Brittle Point in Hours |
|---|---|---|
| Control | | 20 |
| Nickel Stearate | 0.5 | 40 |
| Nickel Stearate | 0.5 | 200 |
| 2,2'-thiobis (4,6-dichlorophenol) | 0.25 | |
| Nickel Stearate | 0.5 | 200 |
| 2,2'-thiobis (4,6-dimethylphenol) | 0.25 | |
| Nickel Stearate | 0.5 | 100 |
| 4-4'-thiobis (3,5-dimethylphenol) | 0.25 | |

We claim:
1. A composition comprising (a) the nickel salt of an alkane carboxylic acid having 6 to 18 carbon atoms and (b) a thiobisphenol of the formula:

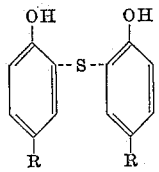

wherein each of the R symbols is an alkyl radical of 4–12 carbon atoms; the components being in the proportion of 0.75–4 parts by weight of (a) for each part of (b).

2. A composition of matter comprising (a) nickel stearate and (b) 2,2'-thiobis(4-t-octylphenol); the proportion of (a) to (b) on a weight basis being 0.75–4:1.

3. A method of stabilizing a polyolefin material selected from the group consisting of polymers of ethylene and polymers of propylene, which comprises incorporating therein the composition of claim 1 in a concentration of 0.1 to 3.0% by weight; and subjecting the mixture thus formed to a temperature in the range of 150° C. to 280° C.

4. A method of improving a polyolefin selected from the group consisting of polymers of ethylene and polymers of propylene, which comprises incorporating therein the composition of claim 2 in a concentration of 0.1 to 3.0% by weight; and subjecting the mixture thus formed to a temperature in the range of 150° C. to 280° C.

5. A composition comprising a polyolefin selected from the group consisting of polymers of ethylene and polymers of propylene and about 0.1 to 3.0% based on the weight of the polymer, of the stabilizer of claim 1.

6. The composition of claim 5 wherein the member is a polymer of propylene.

7. A composition comprising a polyolefin selected from the group consisting of a polymer of ethylene and a polymer of propylene and about 0.1 to 3.0% based on the weight of the polymer, of the stabilizer of claim 2.

8. The composition of claim 7 wherein the member is a polymer of propylene.

References Cited

UNITED STATES PATENTS

| 2,971,940 | 2/1961 | Fuchsman et al. | 260—45.75 |
| 2,971,968 | 2/1961 | Nicholson et al. | 260—45.75 |
| 2,984,634 | 5/1961 | Caldwell et al. | 260—23 |
| 3,006,885 | 10/1961 | Dickson | 260—45.75 |
| 3,006,886 | 10/1961 | Schilling | 260—45.75 |
| 3,072,601 | 1/1963 | Breslow | 260—45.75 |
| 3,074,909 | 1/1963 | Matlack | 260—45.75 |
| 3,074,910 | 1/1963 | Dickson | 260—45.75 |
| 3,102,107 | 8/1963 | Soeder | 260—45.75 |
| 3,107,232 | 10/1963 | Matlack | 260—45.75 |
| 3,127,372 | 3/1964 | Matlack | 260—45.75 |
| 3,201,368 | 8/1965 | Fuchsman | 260—45.75 |
| 3,310,510 | 3/1967 | Breslow | 260—23 |

DONALD E. CZAJA, *Primary Examiner.*

LEON J. BERCOVITZ, *Examiner.*

G. W. RAUCHFUSS, *Assistant Examiner.*